Figure 1:
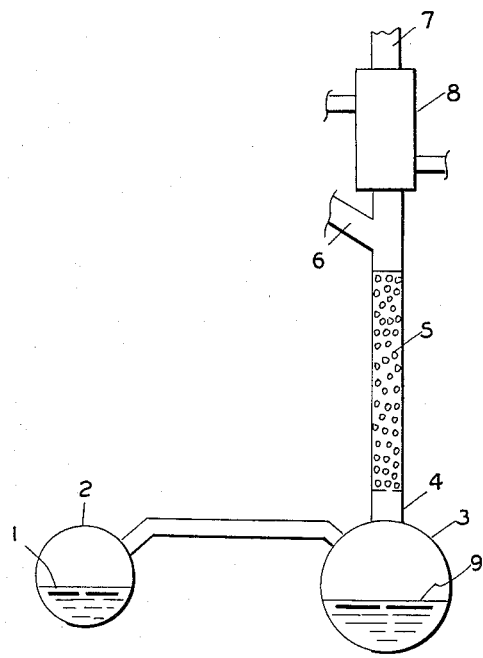

United States Patent Office 3,244,739
Patented Apr. 5, 1966

3,244,739
PREPARATION OF ORGANIC POLYSILICATES
Harold Garton Emblem, Grappenhall, and Norman Albert Hurt, Lymm, England, assignors to Philadelphia Quartz Company, Philadelphia, Pa., a corporation of Pennsylvania
Filed Feb. 23, 1962, Ser. No. 175,046
Claims priority, application Great Britain, Mar. 2, 1961, 7,665/61
13 Claims. (Cl. 260—448.8)

This invention relates to processes for the preparation of organic silicates and more particularly to the manufacture of polysilicate esters.

According to the invention there is provided a process of preparing a liquid polysilicate ester in which a vaporous chloro- or bromo-silane reactant free of organic groups is reacted with a liquid aqueous aliphatic alcohol.

The process of the invention has advantages over the conventional process of preparing polysilicates in which the preparation is carried out entirely in the liquid phase. One advantage is that by the process of the invention higher yields of silicate based on the silicon halide can be obtained. In most cases a 90% or more yield is obtained and it is sometimes as high as 97–99%.

Preferably the amount of alcohol is in excess of that required to produce a completely esterified polysilicate, the unreacted alcohol being removed from the silicate produced at the end of the reaction. A particularly advantageous feature of the process of the invention is that the amount of hydrogen chloride contaminant dissolved in the silicate obtained after removal of the excess alcohol is substantially less than the amount dissolved in the corresponding polysilicate made from reactants all in the liquid phase as in conventional processes. While during the preparation of silicates both by the process of the invention and by the known liquid phase methods, most of the dissolved hydrogen chloride is removed during the removal of the unreacted alcohol, it has been surprising to observe that substantially less acid remains in the polysilicate after the alcohol removal when the silicate is prepared by the process of the invention. As is well known, the presence of too much acid in polysilicates has a serious influence on their hydrolytic stability.

There is preferably used an amount of alcohol which is at least 0.2 mole per mole of halogenosilane reactant in excess of that required to produce a completely esterified product. Preferably the excess alcohol is removed from the final product by distillation at or below atmospheric pressure. However, it may be found convenient especially when the amount of excess alcohol is relatively small and the alcohol is sufficiently volatile to volatilise this alcohol by blowing air through the product, preferably while the product is warmed. It may also be advantageous to blow air through the product at the same time as excess alcohol is distilled off.

The process of the invention is particularly suitable for the preparation of stable polysilicates of high silica content, especially ethyl and isopropyl polysilicates. Stable liquid ethyl silicates containing as much as 60% silica by weight are readily obtainable by the process of the invention. The amount of water employed in the preparation of ethyl and isopropyl silicates is preferably sufficient to bring about the polymerisation of the silicate to a degree such that the silica content of the silicate produced is at least about 40% by weight. It is an advantage of the process of the invention that the low acid content of the high-silica containing silicates can be further reduced by passing air through the product while heating at the boiling point of the alcohol. A reduction is also obtained by refluxing the alcohol-silicate mixture before removing the alcohol.

Polysilicates prepared by the process of the invention may contain some orthosilicate depending on the amount of water used.

The process of the invention can be carried out by reacting a stream of the liquid aqueous alcohol in a packed column with a counter current stream of the vaporous chloro- or bromo-silane reactant. The heat generated by the reaction may be sufficient to keep the halogenosilane reactant in the vapour state while in some cases it may be necessary to provide some external source of heat. Another way of carrying out the process of the invention is to pass the vapour of the halogenosilane into a volume of the liquid aqueous alcohol maintained at a temperature at which the halogenosilane is in the vapour state. Other methods of contacting the halogenosilane vapour with the liquid aqueous alcohol may also be used.

The chlorosilane employed in the process of the invention can comprise or consist of silicon tetrachloride, trichlorosilane or hexachlorodisilane. It has been found, surprisingly, that the vapours of trichlorosilane and hexachlorodisilane both react with a liquid aqueous alcohol to form a polysilicate free of silicon-hydrogen and silicon-silicon linkages. Trichlorosilane and hexachlorodisilane may be used in admixture with silicon tetrachloride vapour. A mixture of the vapours of trichlorosilane and silane and silicon tetrachloride is conveniently prepared by passing hydrogen chloride gas over heated ferrosilicon, preferably in the presence of a copper catalyst. By the passage of chlorine gas over heated ferrosilicon a mixture of the vapours of silicon tetrachloride and hexachlorodisilane can be produced; a relatively small amount of higher chlorides of silicon containing silicon-silicon linkages are produced at the same time and these also react to produce polysilicate.

The preferred aliphatic alcohols employed in the process of the invention are those which are monohydroxy and do not contain reactive substituents of any other functional groups. The alcohols may contain 2 to 18 carbon atoms. Examples are ethyl, isopropyl and n-butyl alcohols, pentan-2-ol, isodecanol, tridecanol and methyl cyclohexanol.

The vapour of the halogenosilane reactant can be conveyed into the reaction zone by means of an inert gas such as nitrogen. A carrier gas will usually be necessary when the halogenosilane reactant consists of or contains an appreciable amount of hexachlorodisilane in order to lower the vapour pressure of this silane reactant so as to reduce its boiling point to below that of the aqueous alcohol.

The hydrogen chloride evolved during the reaction can be led off and reacted with silicon or ferrosilicon, for example, to produce more chlorosilanes.

The polysilicate esters produced by the process of the invention may be used, for example, as binders in the manufacture of refractory articles, such as refractory moulds for the precision casting of metals. The silicates of high silica content are especially valuable for this purpose.

Figure 2:
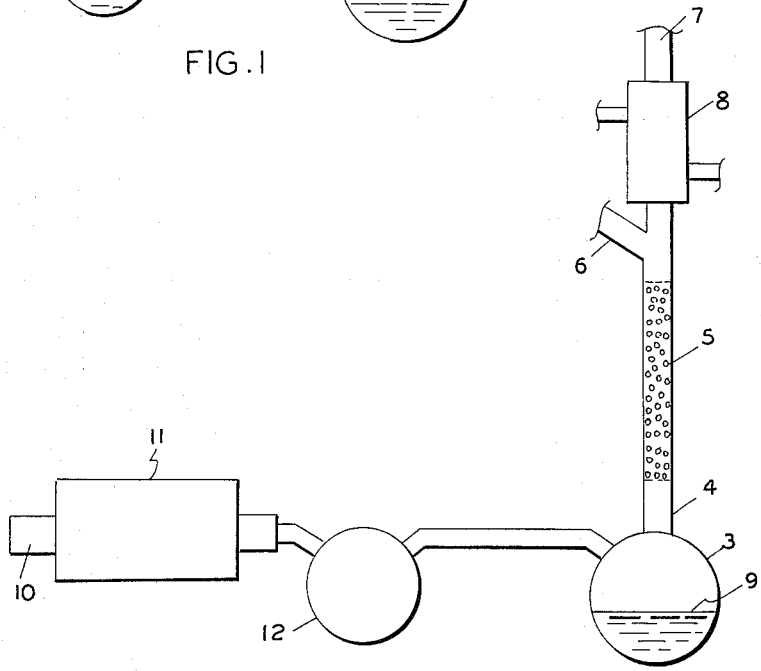

The invention will now be illustrated by the following Examples 1 to 20. The examples will be described in conjunction with the drawing in which:
FIGURE 1 shows one form of apparatus for carrying out the process of the invention, and
FIGURE 2 shows another form of apparatus for carrying out the process of the invention.

The process of each of Examples 1 to 18 was carried out using the apparatus shown in FIGURE 1, in the following manner. A weighed amount of chlorosilane reactant 1 contained in a flask 2 heated by a steam bath was gradually vaporised, the vapour passing into another flask 3 and up a column 4 packed with glass rings 5. The flask 3 was also heated by a steam bath. Near the top of the column at 6, aqueous alcohol was introduced and this ran down the column 4 and reacted with the rising vapour. The heat of reaction was found to be sufficient to maintain the chlorosilane reactant in the vapour state. The hydrogen chloride evolved was led off from the top of the tower at 7. Loss of the volatile reactants was prevented by a cooling water jacket 8 surrounding the upper end of the column 4. A mixture 9 of the polysilicate produced and unreacted alcohol collected in the flask 3. The unreacted alcohol was then distilled off. During this distillation most of the dissolved hydrogen chloride was removed. The product in each case was a clear, physically homogeneous, stable liquid polysilicate containing a relatively small amount of acid.

EXAMPLE 1

In this example the chlorosilane reactant was silicon tetrachloride of weight 85 g. and the aqueous alcohol consisted of a mixture of 9 g. of water and 115 g. of ethyl alcohol. The time taken to pass the silicon tetrachloride vapour was 10 minutes. The weight of the ethyl polysilicate obtained after the removal of the excess ethyl alcohol by distillation at atmospheric pressure was 48 g. The silicate has a silica content of 51.1%. The yield was 81.5%. The acidity of the silicate after the removal of the excess alcohol was 0.29% as HCl.

In a comparative experiment an ethyl polysilicate was made entirely in the liquid phase in the following manner. To 85 g. of silicon tetrachloride was added 115 g. of ethyl alcohol and the mixture was allowed to react at room temperature. 9 g. of water dissolved in 50 g. of ethyl alcohol were then slowly added. When the ensuing exothermic reaction had ceased the excess alcohol was removed by distillation at atmospheric pressure. The ethyl polysilicate obtained weighed 43.5 g. and had a silica content of 52%. The yield was 76%. The acidity of the silicate was 0.45% as HCl. When it was attempted to reduce the acid content of this product by heating it to about 70° C. and blowing air through it, the silicate gelled. In this liquid phase preparation it was necessary to add the water in a further quantity of ethyl alcohol as diluent to prevent precipitation or gelation of the silicate. However, even though an increased volume of alcohol had to be removed in the distillation, the silicate obtained still had an acid content more than 50% higher than the product made by the process of the invention.

EXAMPLE 2

This example was carried out in the same manner as Example 1 except that the weight of the water was 7 g. The weight of the product after removal of excess alcohol by distillation was 62.5 g. The yield was 90.2%. The silicate had a silica content of 43.2%. The acidity of the product after removal of the excess alcohol was 0.13% as HCl.

A comparative experiment was again performed in the same manner as previously except that the weight of water was 7 g. The weight of the silicate obtained was 61 g. and the yield 90%. The acidity of the silicate was 0.17% as HCl, in this case about 30% more than the acidity of the corresponding silicate made by the process of the invention.

EXAMPLE 3

This example was carried out in the same manner as Example 1 except that the weight of water was 6 g. The silica recovery was 84.8%. The product had a silica content of 39.8% and an acidity of 0.126% as HCl.

EXAMPLE 4

This example was carried out in the same manner as Example 3 except that the product was refluxed for one hour before distilling off the excess alcohol. The ethyl silicate produced had a silica content of 41.6% and an acidity of 0.088% as HCl. The yield was 97.2%.

EXAMPLES 5 TO 7

These examples are also concerned with the manufacture of ethyl polysilicates. The processes were carried out as described above again using silicon tetrachloride as the chlorosilane reactant but at the end of the reaction the product was heated under reflux for 30 minutes before the excess alcohol was distilled off. In these cases the distillation processes were continued until the temperature of the liquid rose to about 120° C.

In Table 1 there is given the weight of the reactants, the time for which the silicon tetrachloride vapour was passed, the weight of the silicate finally obtained, the percentage recovery of silica, and the percentage weight of the silica in the product.

*Table 1*

| Example | Weight of $SiCl_4$, g. | Weight of ethanol, g. | Weight of water, g. | Time to pass $SiCl_4$, mins. | Weight of product, g. | Percent recovery of silica | Percent $SiO_2$ in product |
|---|---|---|---|---|---|---|---|
| 5 | 170 | 167.4 | 12.6 | 10 | 112 | 81.0 | 43.4 |
| 6 | 170 | 239.0 | 18.0 | 10 | 108 | 90.5 | 50.1 |
| 7 | 170 | 230.0 | 23.0 | 10 | 97 | 98.5 | 60.7 |

EXAMPLES 8 TO 14

These examples were carried out using isopropyl alcohol as the alcohol. Table 2 gives the following details for these examples: the weight of the reactants (the chlorosilane reactant being in each case silicon tetrachloride), the molar $SiCl_4:H_2O$ ratio, the time for which the silicon tetrachloride was passed, the weight of the silicate product finally obtained, the percentage yield of the product (based on silica recovery) and the percentage weight of silica in the product.

*Table 2*

| Example | Weight of $SiCl_4$, g. | Weight of isopropyl alcohol, g. | Weight of water, g. | Molar ratio $SiCl_4:H_2O$ | Time to pass $SiCl_4$ min. | Weight of product, g. | Percent yield of product | Percent $SiO_2$ in product |
|---|---|---|---|---|---|---|---|---|
| 8 | 85 | 150 | 7.5 | 1:0.84 | 10 | 74.5 | 91.0 | 37.2 |
| 9 | 85 | 150 | 8.5 | 1:0.95 | 6 | 70.0 | 95.6 | 40.1 |
| 10 | 85 | 150 | 9.0 | 1:1 | 6 | 70.2 | 95.4 | 40.8 |
| 11 | 85 | 150 | 9.5 | 1:1.06 | 6 | 72.3 | 97.2 | 40.8 |
| 12 | 85 | 150 | 10.0 | 1:1.11 | 6 | 69.0 | 98.0 | 42.6 |
| 13 | 85 | 150 | 11.0 | 1:1.22 | 8 | 57.5 | 95.2 | 49.6 |
| 14 | 85 | 150 | 12.0 | 1:1.33 | 6 | 55.4 | 93.0 | 50.3 |

(i) recovering a polysilicate product having a low residual HCl content.

2. A process according to claim 1 wherein said alcohol is ethyl alcohol and the silica content of the polysilicate produced is at least 40% by weight.

3. A process according to claim 1 wherein said alcohol is isopropyl alcohol and the silica content of the polysilicate produced is at least 40% by weight.

4. A process according to claim 1 wherein said alcohol is pentan-2-ol.

5. A process according to claim 1 wherein said alcohol is isodecanol.

6. A process according to claim 1 wherein said alcohol is 4-methyl cyclohexanol.

7. A process according to claim 1 wherein said chlorosilane is trichlorosilane.

8. A process according to claim 1 wherein said chlorosilane is hexachlorodisilane.

9. A process according to claim 1 wherein said chlorosilane is trichlorosilane in admixture with silicon tetrachloride.

10. A process according to claim 1 wherein said chlorosilane is hexachlorodisilane in admixture with silicon tetrachloride.

11. A process according to claim 1 wherein said chlorosilane is silicon tetrachloride.

12. A process according to claim 1 wherein the unreacted alcohol is removed by distillation at a pressure which does not exceed atmospheric pressure.

13. A process according to claim 1 wherein dry chlorine gas is passed over finely divided commercial ferrosilicon alloy containing 90–95% silicon to produce an admixture of chlorosilanes, and said chlorosilanes, after removal of ferric chloride therefrom, are utilized as said vaporized chlorosilane material.

References Cited by the Examiner

UNITED STATES PATENTS 2,799,693   7/1957   Dodgson _____ 260—448.8
3,079,656   3/1963   Emblem et al. _____ 260—448.8

FOREIGN PATENTS 467,303   12/1951   Italy.

OTHER REFERENCES

Knop: "Journal Prakt. Chemie," vol. 74 (1858) (pp. 41–8).

Mellor: "A Comprehensive Treatise on Inorganic and Theoretical Chemistry," Longmans, Green and Co., London, publ., vol. 6 (1925), pp. 960–2.

Raskai et al.: 51 Chem. Abstr. 14,541 (1957).

Raskai et al.: "Chem. Techn." (Berlin), vol. 9 (1957), pp. 463–6.

TOBIAS E. LEVOW, *Primary Examiner.*

S. H. BLECH, P. D. FREEDMAN, J. G. LEVITT,
*Assistant Examiners.*

EXAMPLE 15

In this example the chlorosilane reactant consisted of 42.5 g. of a mixture of trichlorosilane and silicon tetrachloride 36% by weight of the mixture being trichlorosilane. This reactant was obtained by condensing the chlorosilane mixture produced by passing hydrogen chloride gas over heated ferrosilicon in the presence of a copper catalyst. The aqueous alcohol employed consisted of a mixture of 3 g. of water and 80 g. of isopropyl alcohol containing 1% by weight of water. The time of passage of the chlorosilane reactant was 6 minutes. The isopropyl polysilicate obtained after removal of excess alcohol by distillation at atmospheric pressure weighed 37 g. and had a silica content of 40%. The yield was 90.4%. No hydrogen was evolved when the product was tested with aqueous caustic soda solution showing the absence of silicon-hydrogen linkages.

EXAMPLE 16

In this example the chlorosilane reactant consisted of 0.5 mole of silicon tetrachloride and the aqueous alcohol consisted of 2.5 moles of pentan-2-ol and 0.39 mole of water dissolved in 5 moles of isopropyl alcohol as mutual solvent. The time taken to pass the silicon tetrachloride vapour was 10 minutes. The excess pentan-2-ol and isopropyl alcohol were recovered by distillation at atmospheric pressure, all of the isopropyl alcohol being recovered. The polysilicate obtained had a silica content of 28.8%. The yield was 90%.

EXAMPLE 17

This example was carried out in the same manner as Example 16 except that isodecanol was used instead of pentan-2-ol. All the isopropyl alcohol was recovered by distillation at atmospheric pressure. The excess isodecanol was distilled off under vacuum. The polysilicate obtained had a silica content of 18.6%. The yield was 89%.

EXAMPLE 18

This example was carried out in the same manner as Example 16 except that a commercial methyl cyclohexanol (consisting mainly of 4-methyl cyclohexanol) was used instead of pentan-2-ol. All the isopropyl alcohol was recovered by distillation at atmospheric pressure. The excess methyl cyclohexanol was distilled off under vacuum. The polysilicate obtained had a silica content of 23.7%. The yield was 77%.

EXAMPLES 19 AND 20

The process of Examples 19 and 20 was carried out using the apparatus shown in FIGURE 2. The processes of these examples were similar to those of the previous examples except that instead of deriving the vapour of the chlorosilane reactant from a quantity of liquid chlorosilane, the vapour was obtained directly by reaction between chlorine and a ferrosilicon alloy. The processes were carried out as follows. Dry chlorine was passed over finely-divided commercial ferrosilicon alloy (90–95% silicon) contained in a mullite tube 10 (length 0.9 metre, diameter 4.5 cm.) heated to 250° C. in an electric furnace 11. The alloy was of such particle size that it all passed a sieve having apertures of width 422 microns and was all retained on a sieve having apertures of width 251 microns. The resulting vaporous chlorosilane mixture consisting essentially of silicon tetrachloride and hexachlorodisilane (about 10% by weight of the mixture being hexachlorodisilane) was freed of ferric chloride by passing the mixture through a flask 12 maintained at 90 to 100° C. The vapours were then passed into flask 3, heated to 80–90° C., and up the column 4 where they reacted with a countercurrent stream of aqueous isopropyl alcohol. The initial flow rate of the chlorine was 5.9 litres per hour but this was increased to 14 litres per hour once the chlorine had begun to react with the ferrosilicon when the temperature of the ferrosilicon rose to 280–290° C.

After the reactants had been passed through the column, the isopropyl polysilicate product was heated under reflux for 30 minutes. The excess isopropyl alcohol was then removed by distillation at atmospheric pressure, the distillation being continued until the temperature of the liquid rose to about 120° C. The recovered alcohol could be used for further preparations of the silicate. During the removal of the excess alcohol practically all the dissolved hydrogen chloride was also removed.

In Table 3 there is given, for Examples 19 and 20, the time for which the chlorosilane reactant was passed, the weight of isopropyl alcohol and the water, the weight of the final silicate product obtained, and the percentage weight of silica in the product. The product in each case was a clear, physically homogeneous, stable, liquid isopropyl silicate containing a relatively small amount of acid.

*Table 3*

| Example | Time of passage of chlorosilane reactant | Weight of isopropyl alcohol, g. | Weight of water, g. | Weight of silicate produced, g. | Percent SiO$_2$ in silicate |
|---|---|---|---|---|---|
| 19 | 3.25 hours | 300 | 10 | 199 | 28.2 |
| 20 | 3.25 hours | 300 | 15 | 125 | 37.2 |

The weights of the recovered alcohols were respectively, 180 g. and 242 g.

The products were tested for compounds containing silicon-silicon linkages by treating them with aqueous caustic soda solution. There was no evolution of hydrogen showing the absence of such compounds.

In the processes described with reference to FIGURE 2, it may be mentioned that the vaporous chlorosilane reactant can also be produced by reacting chlorine with silicon carbide, silica-coke mixtures and other suitable silicon-containing materials.

In the processes of each of the examples, the hydrogen chloride gas led from the top of the reaction column at 7, may be passed over heated silicon or ferrosilicon, for example, and the chlorosilanes produced reacted in the vapour phase, if desired without any intermediate condensation stage, with further quantities of alcohol.

What is claimed is:

1. A process for the preparation of a liquid polysilicate ester having a low acid content which comprises:
   (a) providing a reaction zone consisting of a packed column,
   (b) introducing into the top of said packed column an aqueous liquid alcohol selected from the group consisting of aliphatic alcohols having between 2 and 18 carbon atoms,
   (c) causing said liquid aqueous alcohol to flow downwardly through the column,
   (d) introducing adjacent the bottom of the column a vaporized chlorosilane material selected from the group consisting of trichlorosilane, hexachlorodisilane, silicon tetrachloride and admixtures thereof,
   (e) passing said liquid aqueous alcohol and vaporized chlorosilane material in counter-current contact with each other and allowing them to react with each other in the packed column,
   (f) the amount of said liquid aqueous alcohol being at least 0.2 mole per mole of chlorosilane in excess of that required to produce a completely esterified product,
   (g) the amount of water in said aqueous alcohol being sufficient to bring about the polymerization of the silicate,
   (h) removing the reaction products from the bottom of the packed column and removing from said product unreacted alcohol, and